Patented May 13, 1930

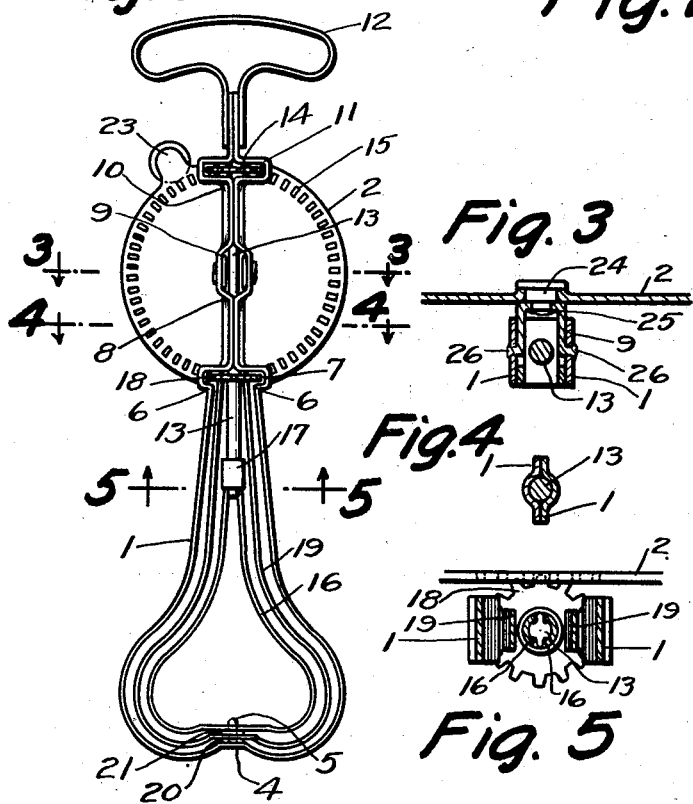
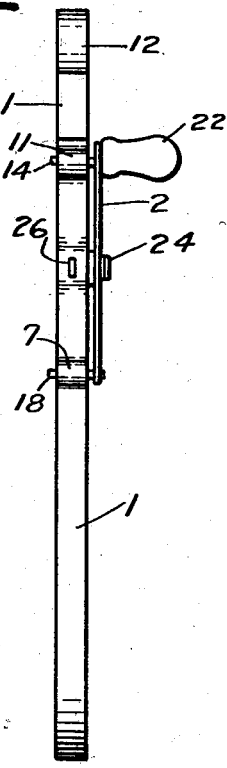
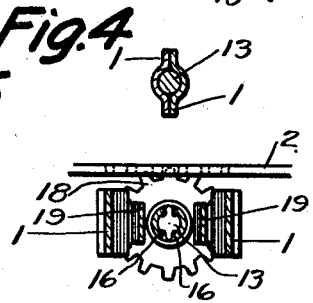
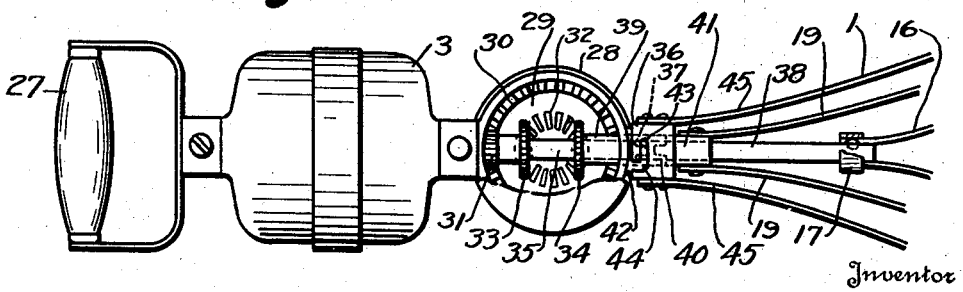

1,758,111

UNITED STATES PATENT OFFICE

FREDERICK W. HENDERSON, OF SEATTLE, WASHINGTON, ASSIGNOR TO HENDERSON CORPORATION, A CORPORATION OF WASHINGTON

MIXING DEVICE

Application filed July 11, 1927. Serial No. 204,776.

The invention is a device for mixing and beating substances such as eggs or cream in which the rotating elements dip downward below the pivot point and rotate in opposite directions about a common center.

The object of the invention is to provide a simple and efficient device for beating and mixing substances, which operates with considerable efficiency and picks up the substance from a substantially flat container.

Another object of the invention is to provide a mixing and beating device in which the rotating elements fold within each other and within a common flat frame so that they are protected when not in use.

Another object of the invention is to provide a beater and mixer in which the beating elements have the same peripheral contour and fold within each other about a common center.

A further object of the invention is to provide a mixer and beater in which the axis of the handle by which the device is rotated is perpendicular to the handle by which the device is held.

A still further object of the invention is to provide a beater and mixer having two rotating elements in which each element is provided with a pinion and both pinions are operated in opposite directions by a common gear.

And a still further object of the invention is to provide a beater and mixer which is durable and which is of a simple and economical construction.

With these ends in view the invention embodies a frame formed of a flat bar with the lower end substantially shaped to the contour of a pear, with a raised pivot point in the center of the bottom and the upper portion surrounding and forming bearings for all moving parts; and rotating elements of the same peripheral contour as the frame rotatably mounted about a common center in the frame and operated by a common gear with a handle by which it is manually rotated. The device may also be provided with a motor by which it may be rotated.

Other features and advantages of the invention will appear from the following description, taken in connection with the drawings, wherein:

Figure 1 is a side view of the device.

Figure 2 is a view looking toward one edge of the device.

Figure 3 is a sectional plan on line 3—3 of Figure 1 showing the shaft and bearing formed in the frame with the gear omitted.

Figure 4 is a section on line 4—4 of Figure 1.

Figure 5 is a sectional view on line 5—5 of Figure 1.

Figure 6 is a view showing an alternate arrangement in which the device is operated by a motor and the gears arranged accordingly.

In the drawings the device is shown as it would be made wherein numeral 1 indicates the frame of the device, numeral 2 the main gear for operating the device and numeral 3 a motor that may be used with the device.

The frame 1 is made as shown with a flat piece of material bent midway of its length to form a flat section 4 to which the rotating members are pivoted on a pin 5 and from the section 4 the bar bends downward and is then curved upward and then inward and upward to the point 6 as shown in Figure 1. From the point 6 the sections of the bar bend outward, upward and inward to form a pocket 7 as shown and from the pocket 7 the bars extend upward to the point 8 where they bend outward, upward and then inward to form an opening 9 and from the opening 9 they extend upward to the point 10. From the point 10 the bars are bent outward, upward and inward to form a pocket 11 and then extend straight upward from the upper side of the pocket. The handle 12 is fixedly attached to the upper ends of the bar. It will be noted that the section between the pockets 7 and 11 and the opening 9 is formed as shown in Figure 4 to provide a bearing for a shaft 13 that is rotatably held therein. It will be noted that this frame provides bearings for the shaft, pockets for the gears and forms a continuous guard around the rotating members within the limits of which the rotating members may be placed when not in use so that they will be protected.

It will also be noted that the frame and rotating members dip downward from the center where they are pivoted so that the pivot point is raised and the rotating parts dip below the center so that it is possible to beat eggs or cream on a substantially flat container, and also adaptable for many other uses where it is desirable to pick up substances below the center or pivot.

The shaft 13 is provided with a gear 14 at the upper end and the gear 14 is located in the pocket 11 and meshes with the openings 15 in the gear 2. The shaft 13 extends downward and at the lower end is a member 16 which is clamped to the shaft by a band 17. It will be noted in Figure 5 that points may be upset from the shaft which will extend between the edges of the member 16 to prevent this member rotating on the shaft. This member may be extended and rolled to form the shaft thereby forming one continuous member. The member 16 is formed of a flat bar which is bent and curved as shown with each point parallel to the frame and with the center of the bottom pivoted upon the pin 5 of the frame. A gear 18 is freely mounted upon the shaft 13 in the pocket 7 and the ends of a member 19 are fixedly attached to the gear 18 as shown. The member 19 is also made of a flat bar which bends and curves so that every point therein is parallel to the frame 1 and the inner member 16, and this bar is also pivoted in the center of the base upon the pin 5. The members 16 and 19 may be provided with saw tooth edges, and they and the frame may be of any suitable shape with one or more of the members dipping below the center or pivot. Washers 20 and 21 may be provided on the pin 5 between the members 16 and 19 and the frame as shown. The gear 18 also meshes with the openings 15 in the gear 2 and the gear 2 is provided with a handle 22 which is attached to a projection 23 so that it may readily be rotated. It will be observed that as the gear 2 is rotated it will rotate the gears 14 and 18 in opposite directions. The gear 2 is rotatably mounted on a pin 24 which is attached to a U-shaped clamp 25 and the clamp 25 is held between the members of the frame 1 and in the opening 9. Sections 26 are formed from the side members of the clamp 25 and the sections 26 extend through openings in and are riveted to the side members of the frame 1 as shown in Figure 3. It is understood that any other suitable means may be used for attaching the clamp and gear to the frame. It will also be noted that as the gear 2 is rotated it will rotate the gears 14 and 18 in opposite directions and thereby rotate the members 16 and 19 in opposite directions.

In the design shown in Figure 6 the device is provided with a motor 3 having a handle 27 and being provided with a gear casing 28 having a large gear 29 therein which has teeth 30 on the side of its outer edge as shown. The teeth 30 mesh with a gear 31 on a motor shaft which causes the gear 29 to rotate with the motor and in the center of the gear 29 is a ring of openings 32 that mesh with gears 33 and 34. The gear 33 is fixedly mounted on a shaft 35 which extends through a socket 36 at the end of the casing 28 and is provided with a joint 37 which extends into the end of a shaft 38 so that when the device is attached it will cause the shaft 38 to rotate with the motor. The shaft 38 is similar to the shaft 13 and the inner members 16 are rigidly attached thereto as shown. The gear 34 is mounted upon a sleeve 39 which is rotatable on a shaft 35 and the sleeve is also provided with a socket 40 by which it is connected to the member 41 so that as the gears 31 and 34 rotate they will, in turn, rotate the members 16 and 19 in opposite directions. At the end of the casing 28 is an extension 42 having a pin 43 thereon and it will be observed that the socket 36 will slide over the extension 42 and the pin 43 may be placed into the slot 44 to hold the socket in place. The upwardly extending members of the frame 1, which in the design are indicated by the numeral 45, may be attached to the surface of the socket 36 as shown in the drawing. It is also understood that any other type of socket may be used to attach the frame and rotating members to the motor and any other suitable gear mechanism may be used through which the motor may drive the members 16 and 19 in opposite directions.

It will be understood that changes may be made in the construction without departing from the spirit of the invention, one of which changes may be in the exact design of the frame, as it is understood the frame may be made in any other suitable design. Another may be in the arrangement of the gears for operating the device and still another may be in the arrangement of the bearings or handle of the frame.

The construction will be readily understood from the foregoing description. Normally the device may rest with the rotating members folded within the limits of the frame so that they are protected thereby; and it will be observed that when it is desired to use the device it may be held in the left hand by the handle 12 and dipped into a container in which is a substance to be mixed or beaten and as the device is rotated by the handle 22 the elements 16 and 19 rotate in opposite directions. As the outer parts of the rotating elements dip below the pivot point of the center it is possible to dip up and mix, whip, or beat a substance in a container that is practically flat. The oppositely rotating elements of the same peripheral contour provide a very efficient means of thoroughly mixing, beating, or whipping a substance and make it possible to whip a substance very thoroughly and provide a whipped cream of a very fine texture.

Having thus fully described the invention what I claim as new and desire to secure by Letters Patent is:

1. A beater having two oppositely rotating elements of the same peripheral contour, rotating about the same axis, one slightly larger than the other, and the larger enveloping the smaller, said rotating elements being pivoted at the bottom in the center and extending downward below the pivot point between the center and outer edge.

2. A beater having two oppositely rotating elements of the same peripheral contour, rotating about the same axis, one being slightly smaller than and rotating inside of the other, said rotating elements being pivoted at the bottom in the center and extending downward below the pivot point between the center and outer edge.

3. A beater having two oppositely rotating elements of the same peripheral contour, rotating about the same axis, one being slightly smaller than and rotating inside of the other, said elements being of a pear shape with the outer corners dipping downward below the pivot at the center.

4. A beater having two oppositely rotating elements of the same peripheral contour, rotating about the same axis, one being slightly smaller than and rotating inside of the other, said rotating elements being substantially of a pear shape and pivoted in the center at the bottom and said pivot point extending upward so that the outer corners of the elements are below the pivot point.

5. A beater having two oppositely rotating elements of the same peripheral contour, rotating about the same axis, one being slightly smaller than and rotating inside of the other, and a single continuous frame surrounding the beaters and surrounding and forming a bearing for all moving parts and a rest for free operation of the beater.

6. A beater having two oppositely rotating elements of the same peripheral contour, rotating about the same axis, one being slightly smaller than and rotating inside of the other, gears meshing with a common gear at the upper ends of the elements by which they may be rotated, and a single continuous frame surrounding the beaters, housing the drive mechanism and alone forming a bearing for and protecting all moving parts.

7. In a mixing and beating device having a plurality of rotating elements the forming of the said elements so that they will dip below the point at which they are pivoted at the bottom.

8. In a mixing and beating device of the class described, a continuous one piece frame bent to form a guard for the mixing elements and also to form bearings, a handle at the upper end of the frame, a rotatable shaft mounted in the bearings of the said frame, a gear fixedly mounted on one end of the said shaft, another gear rotatably mounted on the said shaft, another gear pivotally mounted midway between the gears and meshing with both of the gears to rotate them in opposite directions, a crank for rotating the said latter gear, a bar bent in the form of the contour of a pear attached to the lower end of the said shaft and also pivotally held in the center of the base of the said frame, and another similar bar between the said former bar and the frame having its ends attached to the gear that is rotatably mounted on the said shaft and its opposite end pivotally attached to the center of the base of the frame, the outer portions of the said bars and frame dipping below the pivot at the center of the bottom.

9. In a device of the class described, a beater having a plurality of parallel rotating elements, rotating about a common center in which some of the elements are curved to extend downward below a pivot point in the base.

10. In a mixing device or beater of the class described, a plurality of rotatable elements adaptable to fold into themselves, each of the said elements having independent gears in axial alignment, a common gear meshing with the two said former gears, and means for rotating the said latter gear, said rotatable elements dipping downward below the center at the bottom.

11. In a mixing and beating device of the class described, a plurality of curved bars parallel at all points and positioned to rotate in opposite directions about a common center, a stationary frame of the same shape as the bars and in which the bars are mounted, and means for rotating the said bars, said bars dipping downward between the point at which they are pivoted at the center of the bottom and the outer edge.

12. In a mixing and beating device of the class described, a plurality of bars parallel at all points and positioned to rotate in opposite directions about a common center, said bars dipping downward between the point at which they are pivoted at the center of the bottom and the outer edge.

13. In a mixing and beating device, a plurality of bars, some smaller than others, in which the sides are parallel at all points, said bars being mounted and positioned to rotate in opposite directions about a common center, and means for operating the said bars, said bars dipping downward between the point at which they are pivoted at the center of the bottom and the outer edge.

14. In a mixing and beating device, a plurality of bars in which the sides are parallel at all points, said bars being mounted and positioned to rotate in opposite directions and within each other about a common center and being substantially of a pear shape, and means for operating the said bars, said bars dipping downward between the point at which they are pivoted at the center of the bottom and the outer edge.

15. In a mixing and beating device, a plurality of bars in which the sides are parallel at all points, said bars being mounted and positioned to rotate in opposite directions about a common center, and being substantially of a pear shape; means for operating the said bars, and a suitable frame of the same shape as the bars in which the said device is mounted, said bars lying within the frame and protected by it when at rest.

16. A beater and mixer of the class described, having a plurality of bars bent substantially in the shape of a pear, said bars being attached to gears at the upper ends, and a common gear by which the said device may be operated, through the former gears, said bars dipping downward between the point at which they are pivoted at the center of the bottom and the outer edge.

17. In a mixing and beating device of the class described, a plurality of flat bars bent substantially to a pear shape with each bar parallel to the other at all points, a frame of the same shape surrounding the bars, and a plurality of gears arranged to rotate the intermediate bars in opposite directions, said bars dipping downward between the point at which they are pivoted at the center of the bottom and the outer edge.

18. In a device of the class described, two beating elements, one within the other and folding parallel to each other and also parallel to and lying within a continuous stationary frame.

19. In a mixing and beating device of the class described, a plurality of flat bars bent substantially to a pear shape with each bar parallel to the other, at all points, a frame of the same shape surrounding the bars, a plurality of gears arranged to rotate the intermediate bars in opposite directions, and means for readily operating the said device by a small motor, said motor being adaptable to be readily attached or detached from the said device.

In testimony whereof I affix my signature.

FREDERICK W. HENDERSON.